United States Patent [19]

Mikada

[11] Patent Number: 5,355,260
[45] Date of Patent: Oct. 11, 1994

[54] SERVO SYSTEM FOR POSITIONING A READ/WRITE HEAD WITHIN A STORAGE DEVICE WITH MEANS FOR DETECTING MALFUNCTIONS IN THE SERVO DATA

[75] Inventor: Masako Mikada, Higashimurayama, Japan

[73] Assignee: Kabushiki Kaisha Toshiba, Kawasaki, Japan

[21] Appl. No.: 993,807

[22] Filed: Dec. 14, 1992

Related U.S. Application Data

[63] Continuation of Ser. No. 557,805, Jul. 26, 1990, abandoned.

[30] Foreign Application Priority Data

Jul. 28, 1989 [JP] Japan .................................. 1-194068

[51] Int. Cl.⁵ .......................... G11B 5/09; G11B 15/18
[52] U.S. Cl. .................................. 360/51; 360/69
[58] Field of Search .................... 360/51, 77.01, 77.02, 360/77.08, 77.15, 69, 77.05, 77.12, 77.13, 77.14; 369/44.32, 53, 58

[56] References Cited

U.S. PATENT DOCUMENTS

| | | | |
|---|---|---|---|
| 4,238,809 | 12/1980 | Fujiki et al. | 360/131 |
| 4,390,910 | 6/1983 | Wilson | 360/51 |
| 4,811,126 | 3/1989 | Suzuki et al. | 360/51 |
| 4,910,617 | 3/1990 | Brunnett et al. | 360/77.08 |
| 5,115,359 | 5/1992 | Sidman | 360/77.05 |
| 5,177,651 | 1/1993 | Moraru et al. | 360/77.08 |

*Primary Examiner*—Michael C. Wimer
*Assistant Examiner*—Won Tae C. Kim
*Attorney, Agent, or Firm*—Finnigan, Henderson, Farabow, Garrett & Dunner

[57] ABSTRACT

In a servo system for a hard disk drive, a malfunction detection circuit monitors a period of a sync signal contained in servo data and outputs a malfunction detection signal indicating that there is a malfunction relating on the servo data. The malfunction detection circuit delivers a malfunction detecting signal when a generation period of a sync signal is longer or shorter than a predetermined cycle initially set. The malfunction detecting circuit includes a pulse generator for generating a pulse signal which is synchronized with the sync signal and first and second pulse generators for measuring a period of the sync signal.

1 Claim, 8 Drawing Sheets

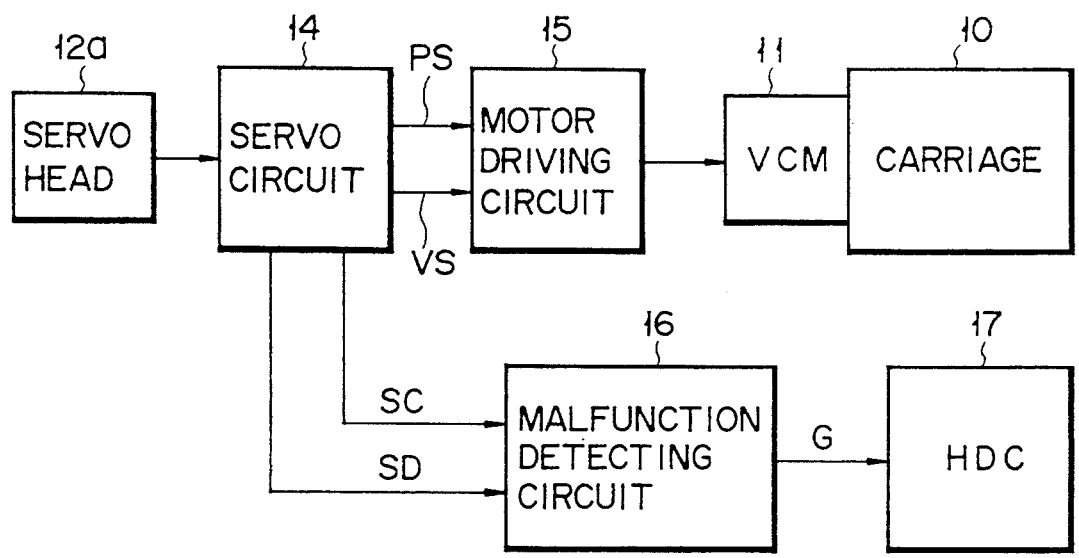
F I G. 1
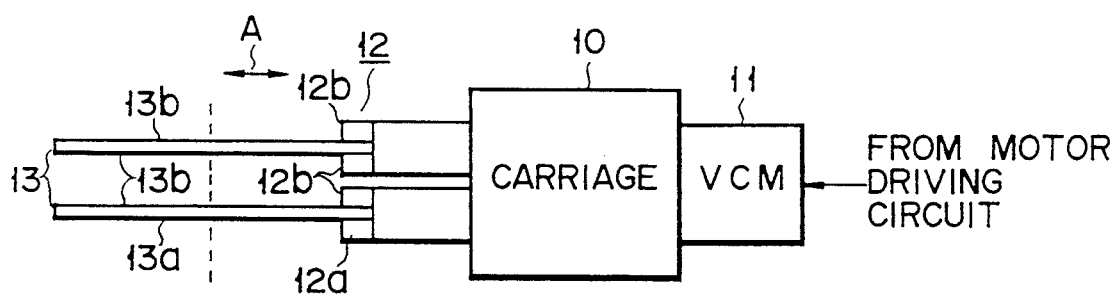
F I G. 2

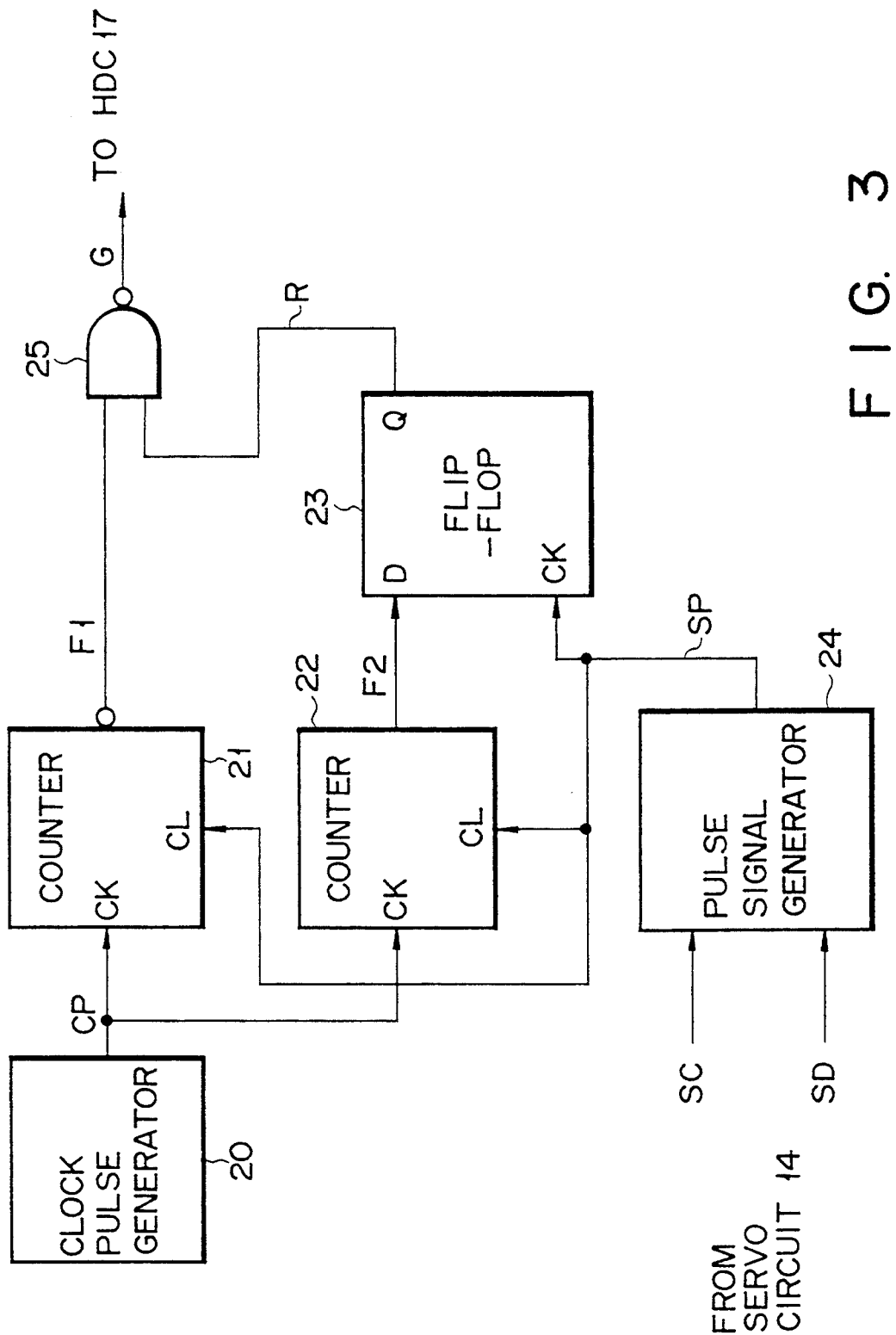
F I G. 3

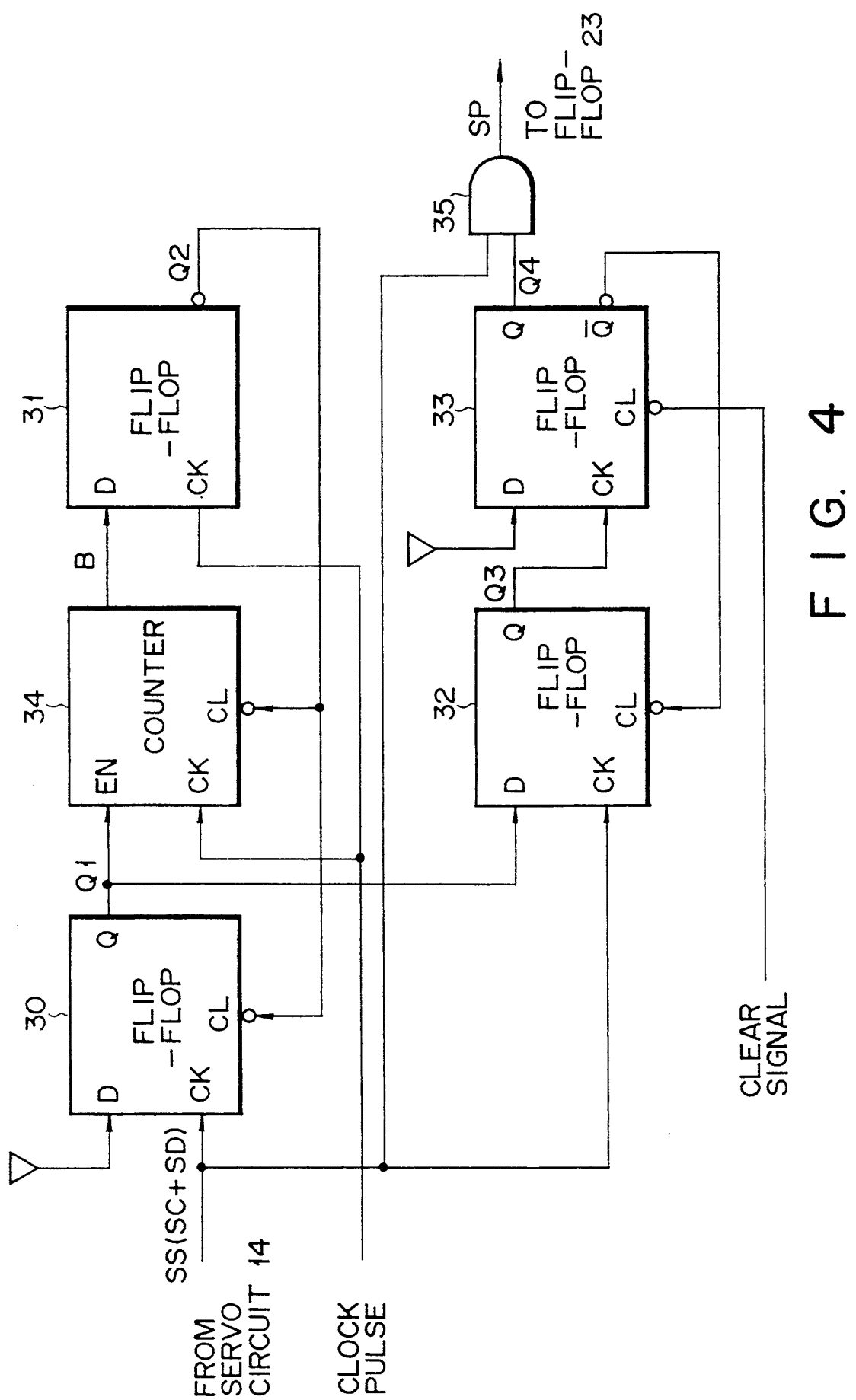
F I G. 4

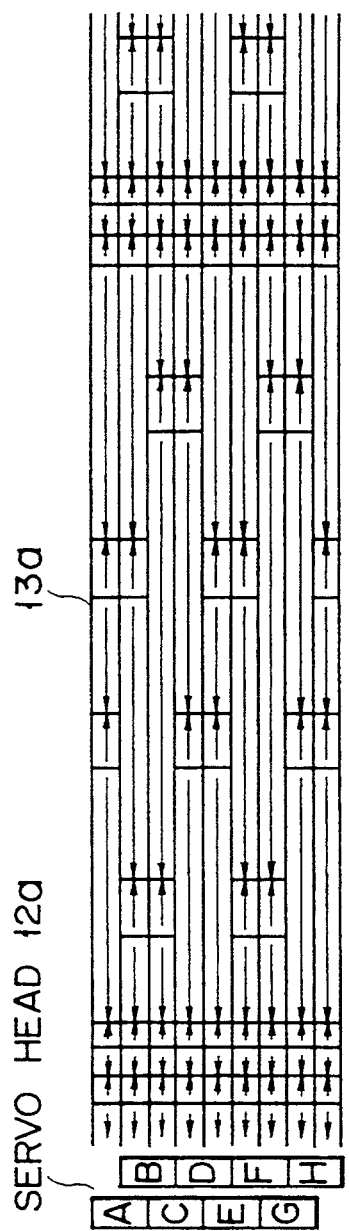
FIG. 6
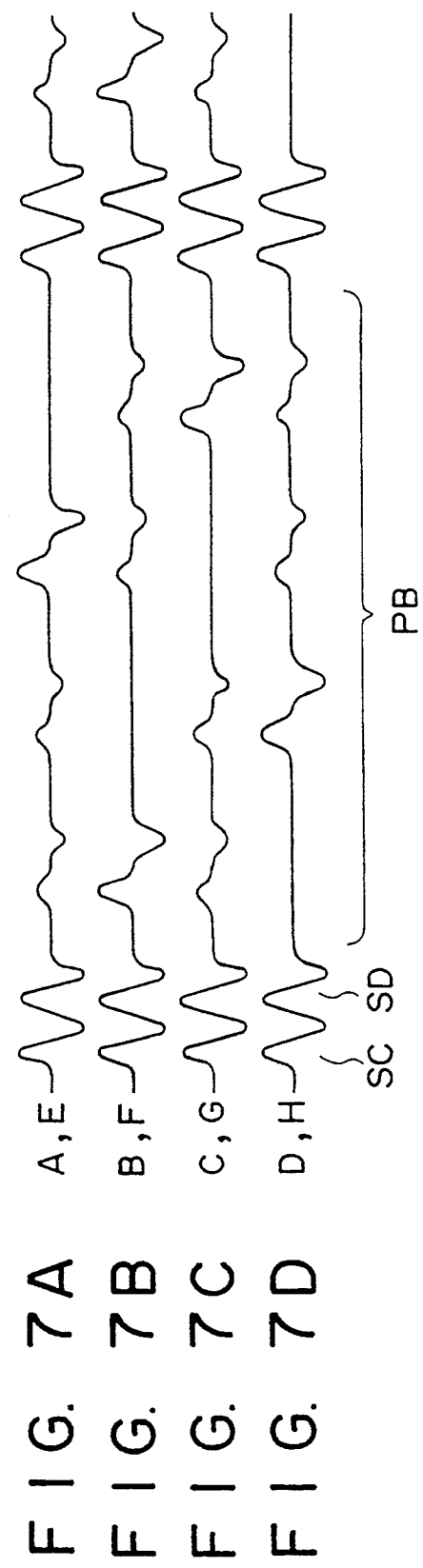
FIG. 7A  A, E
FIG. 7B  B, F
FIG. 7C  C, G
FIG. 7D  D, H

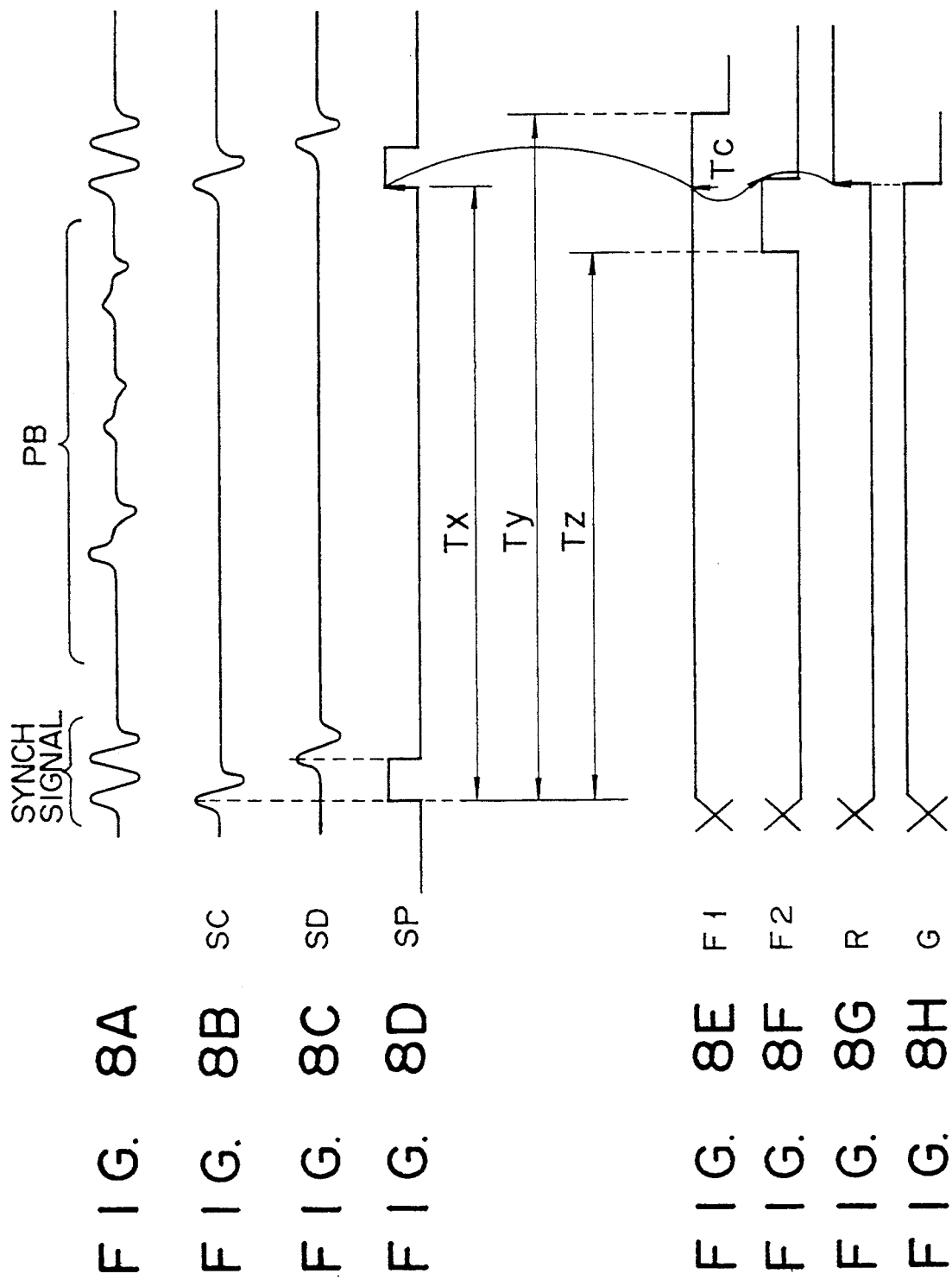

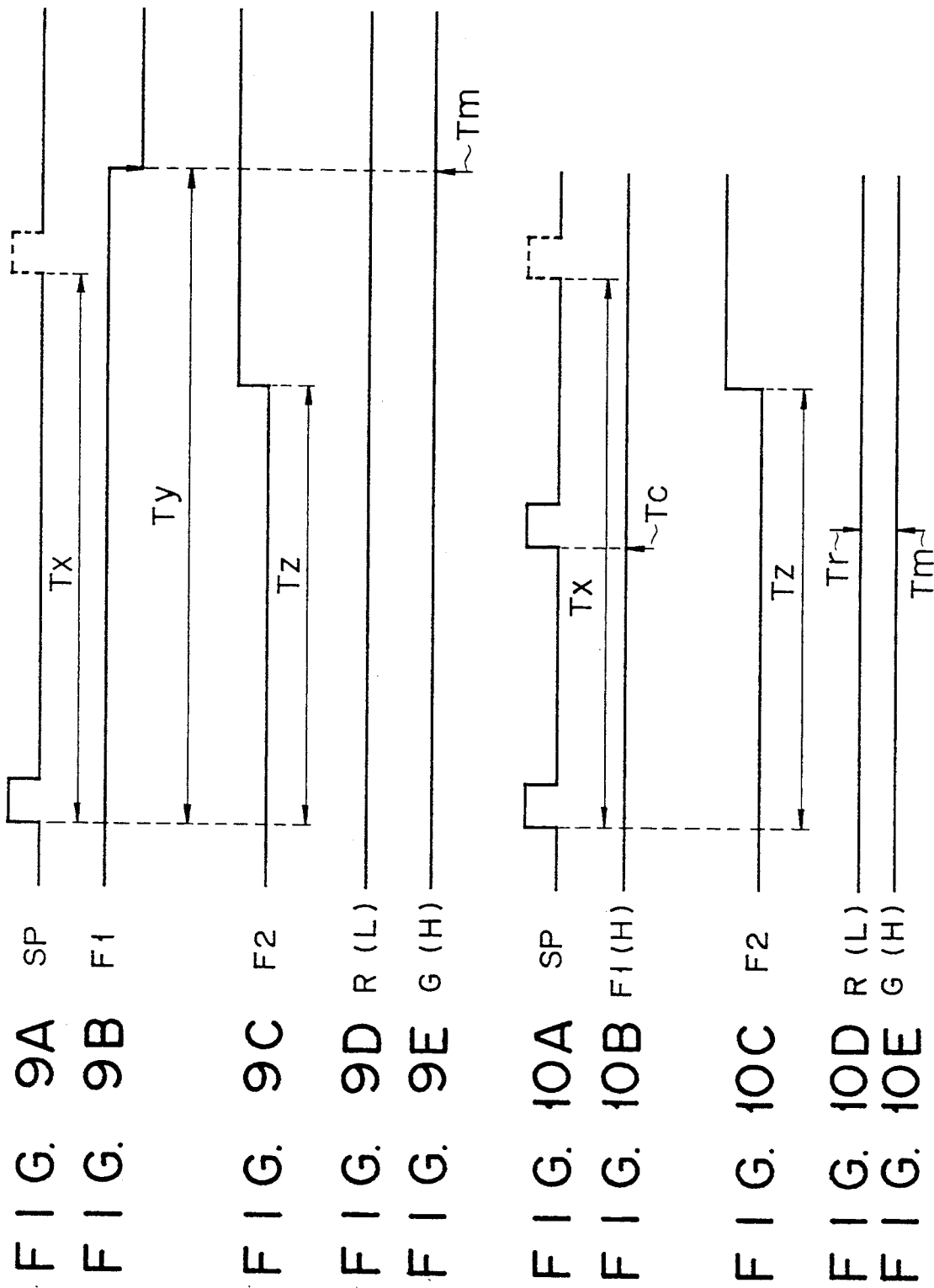

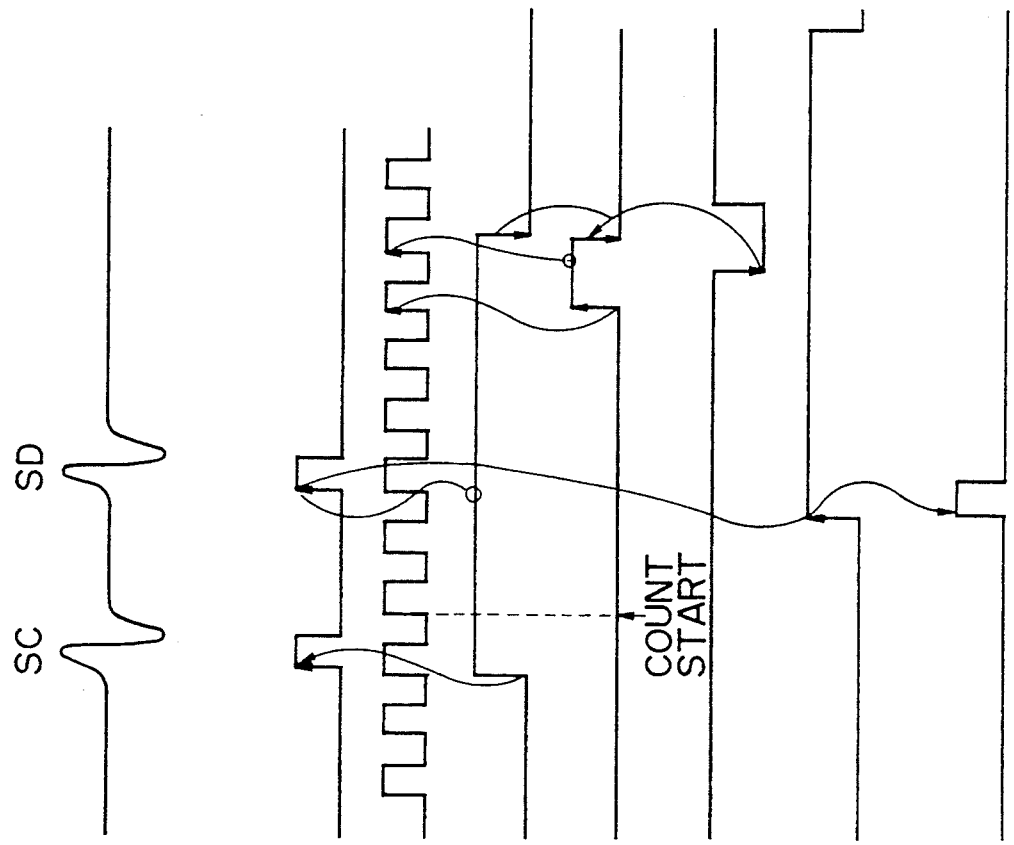

SERVO SYSTEM FOR POSITIONING A READ/WRITE HEAD WITHIN A STORAGE DEVICE WITH MEANS FOR DETECTING MALFUNCTIONS IN THE SERVO DATA

This application is a continuation of application Ser. No. 07/557,805 filed Jul. 26, 1990, now abandoned.

BACKGROUND OF THE INVENTION

1. Field of the Invention

The present invention relates to a servo system for positioning a read/write head over a destination track of a storage medium and, in particular, to a servo system which is used for a hard disc drive.

2. Description of the Related Art

In a conventional hard disk drive (HDD), a head is moved to a destination track (destination cylinder) of a storage medium, such as a disk, to gain access to data on that destination track. The servo system positions a head over the destination track of the disk. The servo system detects a head's current position (current track) of the disk through the utilization of initially recorded servo data and implements a head positioning control operation based on the head's current position. The servo data is recorded on a dedicated servo surface. Two types of heads are employed: one type being a single servo head corresponding to the servo surface and the other type being a plurality of data heads corresponding to a data surface. The servo head reads servo data from the servo surface and delivers it to a position transducer, that is a position signal generator. The position transducer delivers a position signal corresponding to the current position of the head. The servo head and data heads are mounted on a carriage and moved in a radial direction of the disk by driving the carriage. The respective data head follows the servo head under head positioning control by the servo system and is moved to the destination track of the disk.

The servo data is composed of position data which is differently varied in magnetic flux in accordance with a sync signal and track position. The sync signal is composed of a sync clock and sync data and circumferentially recorded at equal intervals on the servo track of the servo surface. Further, the sync signal is continuously recorded radially in the same position of all the servo tracks on the servo surface.

The servo circuit separates a sync signal and position data from servo data read out by the servo head. The servo circuit includes a position transducer for transforming the position data to a position signal and velocity detector for differentiating the position signal and outputting a velocity signal corresponding to an actual speed of the head. This technique is disclosed, for example, in U.S. Pat. No. 4,238,809.

In the servo system, if servo data is normally not recorded on the servo surface of the disk, it is naturally not possible to position the head under head positioning control. In the even of a malfunction relating to the servo data, therefore, it is necessary to detect the malfunction. A servo data malfunction detection system is conceived for monitoring the level of servo data read by a servo head and delivering a malfunction detection signal when that level falls below a preset reference level. Even in the case where servo data is normally recorded on the disk, a servo data malfunction signal is delivered as an output signal when the output signal of the servo head wholly goes low. Stated in another way, in the event of a malfunction on a servo data reading system including a servo head, a servo data malfunction detection operation is done even if servo data is recorded as normal data.

SUMMARY OF THE INVENTION

It is accordingly the object of the present invention to provide a servo system for positioning a head over a destination track with the use of servo data recorded on a disk, in which, when a malfunction occurs relating on servo data, the head can be positively positioned over the destination track, under a head positioning control action, through a positive servo data malfunction detection.

According to the present invention, there is provided a servo system for positioning a head with a storage device, comprising:

a storage medium having initially recorded servo data composed of a sync signal and position data, the storage medium being used for positioning the head over a destination position;

a servo data reproducing unit for reproducing the servo data from the storage medium and for separating the sync signal from the servo data;

a period detecting unit for detecting a generation time period of the sync signal which is output from the servo data reproducing unit;

a malfunction detecting circuit for comparing the generation time period of the sync signal detected by the period detecting unit with a normal generation time period of an initially recorded sync signal, and for outputting a malfunction detection signal, when there is no coincidence upon comparison, indicating that there is a malfunction relating to the servo data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a block diagram showing a block diagram showing an arrangement of a servo system according to an embodiment of the present invention;

FIG. 2 is a block diagram showing an arrangement of a carriage mechanism for an HDD as used in the present embodiment;

FIG. 3 is a block diagram showing an arrangement showing a malfunction detecting circuit of FIG. 1;

FIG. 4 is a block diagram showing a pulse signal generator for the malfunction detecting circuit of FIG. 3;

FIG. 6 shows a state in which servo data is recorded on the present embodiment;

FIGS. 7A to 7D are a signal waveform diagram of servo data read out of a servo head in the present embodiment;

FIGS. 8A to 8H are a timing chart for explaining the operation of the malfunction detecting circuit in the present embodiment;

FIGS. 9A to 9E are a timing chart for explaining the operation of the malfunction detecting circuit in the present embodiment;

FIGS. 10A to 10E are a timing chart for explaining the operation of the malfunction detecting circuit in the present embodiment; and FIGS. 11A to 11H are a timing chart for explaining the operation of the pulse signal generator shown in FIG. 4.

DETAILED DESCRIPTION OF THE PREFERRED EMBODIMENTS

Figure 5:
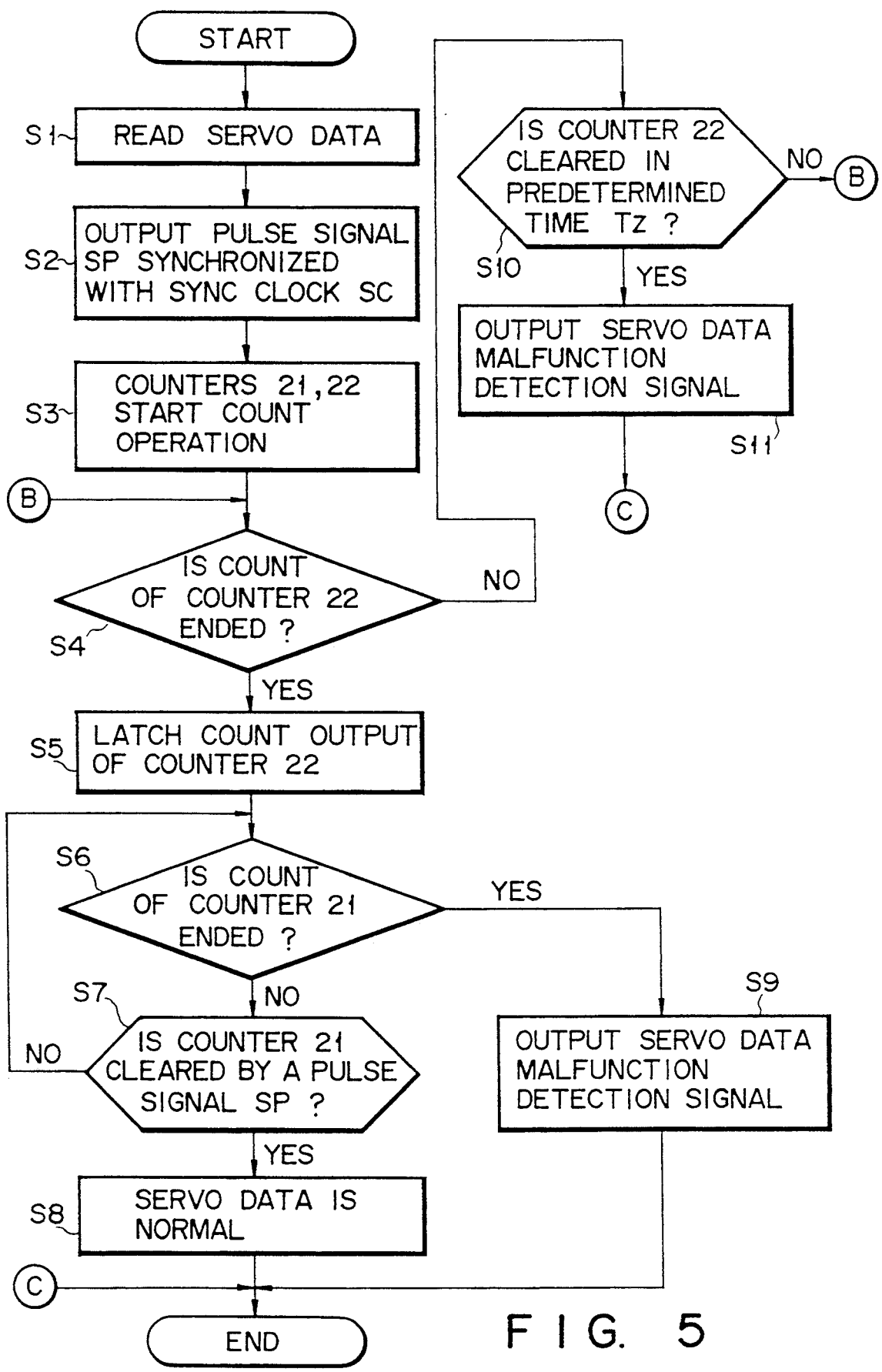
FIG. 5 is a flowchart for explaining the operation of the malfunction detecting circuit of the present embodiment.

A servo system according to an embodiment of the present invention will be explained below.

For an HDD, a head 12 comprising a servo head 12a and plurality of data heads 12b is mounted on a carriage 10 as shown in FIG. 2. The carriage 10 is driven by a voice coil motor (VCM) 11 to move the head 12 in a radial direction (an arrow A) of disk 13. The disk 13 is rotationally driven by a rotational drive motor, not shown. The servo head 12a seeks over a dedicated servo surface 13a of the disk and reads servo data initially recorded on the dedicated servo surface 13a of the disk. The respective data head 12b seeks over the servo surface 13b of the disk 13, while following the servo head 12a, and gains access to the data surface 13b of the disk 13.

In the servo system, as shown in FIG. 1, a servo circuit 14 is adapted to process servo data read by the servo head 12a from the servo surface 13a of the disk 13 to implement the positioning control of the servo head 12a. The servo circuit 14 includes a position transducer for transforming servo data which is output from the servo head 12a to a position signal PS and speed control circuit for delivering a velocity signal VS to allow control of the servo head 12a during seek operations. The position signal PS corresponds to a current track on the disk, which is occupied by the servo head 12a, and becomes a zero level when the servo head 12a is positioned over the center of the track (servo track). The speed control circuit calculates a distance across which the servo head 12a is moved from the current track to a destination track (destination cylinder) and calculates a target speed corresponding to the distance thus moved. The destination track is given as data by an HDC (head disk controller) 17. The speed control circuit differentiates the position signal PS and calculates an actual speed with which the servo head 12a is moved. The speed control circuit generates a velocity signal VS and delivers it to a motor driving circuit 15.

The motor driving circuit 15, after a voltage signal (velocity signal VS) has been converted to a drive current, supplies a drive current to a VCM 11 for drive. VCM 11 drives the carriage 10 in accordance with a drive current to move the servo head 12a (and data head 12b) to a destination track of the disk 13 for positioning.

In the servo system of the present embodiment, a malfunction detecting circuit 16 is provided for detecting a malfunction of servo data. The malfunction detecting circuit 16 interrogates servo data for the presence or absence of a malfunction, in accordance with a sync signal which is output from the servo circuit 14. The sync signal is one obtained by separating position data PB from servo data which is read by the servo head 12a, and is composed of a sync clock SC and sync data SD (FIG. 8A). The position data PB is transformed by the servo circuit 14 to the position signal SP. Upon detecting a servo data malfunction, the malfunction detecting circuit 16 delivers a malfunction detection signal G to an HDC 17. HDC 17, upon receipt of the malfunction detection signal G, implements a stop control operation, such as an HDD drive stop operation.

The malfunction detecting circuit 16 comprises, as shown in FIG. 3, a clock pulse generator 20, first counter 21, second counter 22, flip-flop 23, pulse signal generator 24 and NAND gate 25.

The clock pulse generator 20 delivers a clock signal pulse CP of a predetermined cycle necessary for count operation by respective counters 21 and 22. The first counters 21 and 22 are cleared by the pulse signal SP originating from the pulse signal generator 24 and make a count to a preset count value in accordance with the input state of clock pulses. Upon a count-up operation by the second counter 22, the flip-flop 23 receives a corresponding count-up signal (logic "H") F2 and latches it thereto. An NAND gate 25 receives the count-up signal (logic "L") F1 and output signal R from the first counter 21 and flip-flop 23, respectively, and delivers a malfunction detection signal (logic "H") G to HDC 17.

The pulse signal generator 24 generates a pulse signal PS which is synchronized with a sync signal, and comprises flip-flops 30 to 33, counter 34 and AND gate 35 as shown in FIG. 4. The respective constituent elements of the pulse signal generator 24 are operated as shown in a timing chart of FIGS. 11A to 11H. The flip-flops 30 and 32 are operated upon receiving, as a clock signal, a sync signal (a pulse signal SS composed of SC and SD) which is output from the servo circuit 14. The counter 34 starts a count operation corresponding to an input state of a clock pulse of a predetermined cycle upon receiving an output signal Q1 from the flip-flop 30 at a location of its enable terminal EN. The flip-flop 31 receives a count-up signal B from the counter 34 to allow it to be latched thereto and delivers a clear signal Q2 to the flip-flop 30 and counter 34. The flip-flop 33 receives an output signal Q3 as a clock signal from the flip-flop 32 and delivers an output signal Q4 to a first input terminal of the AND gate 35. A sync signal SS output from the servo circuit 14 is input to a second input terminal of the AND gate 35. The AND gate 35 delivers a pulse signal SP which is synchronized with the sync signal SS.

The operation of the present embodiment will be explained below.

Upon being given a seek instruction from the host computer to the present servo system, the servo head 12a reads servo data from the servo surface 13a of the disk 13 at step S1 in FIG. 5. The servo circuit 14 processes the servo data fed from the servo head 12a to generate a position signal PS and velocity signal VS. Thus the servo head 12a implements a head positioning control operation. Put it in another way, the servo head 12a seeks just over the destination track at a moving speed corresponding to the velocity signal VS and is positioned just over the center of the destination track in accordance with the position signal PS.

The servo data which differently varies in magnetic flux from position to position of the tracks is initially recorded in the servo surface 13a of the disk 13 as shown in FIG. 6. The servo data read from the servo head 12a takes a signal waveform corresponding to positions A to H on the servo head 12a as shown in FIGS. 7A to 7D. The sync signal (SC and SD) is delivered at a predetermined time interval during a normal rotation of the disk 13 even if the servo head 12a is located anywhere over the servo surface 13a of the disk 13. The position data (position bits) PB is composed of bits representing four position information. The position and direction in which the servo head 12a is moved across the disk surface are detected with the use of a combination of the level of the position data PB and polarity of a varying magnetic flux.

The servo circuit 14 implements the head positioning control operation of the servo head 12a and separates the sync signal (SC and SD) from the servo data and delivers it to the malfunction detection circuit 16. In the malfunction detection circuit 16, the pulse signal generator 24 generates a pulse signal SP in synchronism with the sync signal as shown in FIGS. 8B to 8D and delivers it as an output signal—step S2. The pulse signal SP is delivered at a predetermined cycle (period Tx) in synchronization with the sync signal. The pulse signal generator 24 delivers the pulse signal SP to the clear terminals CL of the first and second counters 21 and 22.

The first and second counters 21 and 22 are cleared by the pulse signal SP and start a count operation (step S3) upon receipt of the clock pulse CP of a predetermined cycle from the clock pulse generator 20. The second counter 22 has its predetermined count value preset so as to effect a count-up operation in a brief period of time Tz shorter than the period Tx of the pulse signal SP. Stated in another way, the second counter 22 effects a count-up operation during a time period Tz shorter than the cycle Tx which ranges from the preceding pulse SP to the next subsequent pulse SP (FIGS. 8D, 8F). The flip-flop 23 latches a count-up signal F2 coming from the second counter 22 thereto—steps S4 and S5.

The first counter 21 has its predetermined count value preset so as to perform a count-up operation for a period Ty longer than the cycle Tx of the pulse signal SP, there is, the first counter 21 performs a count-up operation up to a time period Ty shorter than the time period Tx, as shown in FIGS. 8D and BE, in the case where there is no emergence of the next pulse SP at the Clear terminal CL of the first counter 21.

If the servo data is normally stored in the servo circuit, the sync signal is output correctly from the servo circuit 14 in the predetermined cycle. Thus the pulse signal SP which is synchronized with the sync signal is output from the pulse signal generator 24 in the predetermined cycle Tx. Let it be assumed that, before the counts-up (count end) operation, the first counter 21 is cleared by the next pulse SP from the pulse signal generator 24 (at time Tc in FIG. 8). The first counter 21 delivers a logic "H" signal F1 to the first input terminal of the NAND gate 25. At this time, the flip-flop 23 allows a count-up signal F2 which is supplied from the second counter 22 to be latched thereto by the next pulse SP and delivers a logic "H" signal R corresponding to the count-up signal F2 to the second input terminal of the NAND gate 25. The NAND gate 25 delivers a logic "L" signal G, that is a signal showing that the servo data is normal, to HDC 17. Thus HDC 17 receives the logic "L" signal G, when that next normal pulse SP is delivered, and determines that the servo data is normally recorded-steps S6 to S8.

Let it be assumed that, as shown in FIG. 9A, there occurs a malfunction relative to servo data recorded on the servo surface 13a of the disk 13 and that the pulse signal SD synchronized with the sync signal which is read out of the servo head 12a does not emerge at the predetermined cycle Tx. In this case, as shown in FIG. 9C, the second counter 22 makes a count-up operation for a time period Tz to deliver a logic "H" signal F2 as an output. Since, however, the next pulse SP is not generated from the pulse signal generator 24, the logic "H" signal F2 is not latched at the flip-flop 23 and, as shown in FIG. 9D, the flip-flop 23 delivers a logic "L" signal R. On the other hand, the first counter 21 is not cleared due to a failure of the next pulse SP to emerge and makes a count-up operation to the time period Ty, that is, as shown in FIG. 9B, the first counter 21 delivers a logic "L" signal F1 to the first input terminal of the NAND gate 25 (time Tm) after a lapse of the time period Ty. Since, at this time, the logic "L" signal R is input from the flip-flop 23 to the second input terminal of the NAND gate 25, the logic "H" malfunction detection signal G is output to HDC 17 (FIG. 9E). HDC 17 receives the logic "H" malfunction detection signal G at a lapse of a time period Tm, that is, the time period Ty longer than the cycle Tx of the normal detection signal G and determines that the servo data is malfunction—steps S6, S9.

Let it now be assumed that, as shown in FIG. 10A, a malfunction occurs relative to the servo data recorded on the servo surface 13a of the disk 13 and that a pulse signal SP synchronized with the sync signal read out from the servo head 12a is delivered as an output within the predetermined cycle Tx. As shown in FIG. 10C, since in this case the second counter 22 is set by the next pulse SP to a clear state (time Tc) before its count-up operation at a time period Tz, a logic "L" signal F2 is delivered as an output. The flip-flop 23 allows a logic "L" signal F2 to be latched thereto (time Tr) by the next pulse SP as shown in FIG. 10D and delivers a logic "L" signal R—steps S4, S10.

At this time, since the first counter 21 is cleared by the next malfunction pulse SP without being counted up, the logic "H" signal F1 is output to the first input terminal of the NAND gate 25—FIG. 10B. Since the logic "L" signal R is input from the flip-flop 23 to the second input terminal of the NAND gate 25, the NAND gate delivers a logic "H" malfunction detection signal G to HDC 17 (FIG. 10E). HDC 17 receives the logic "H" malfunction detection signal G at a time of outputting the next pulse SP and, by so doing, determines that the servo data is malfunctional—Step S11.

As appreciated from the above, the malfunction detecting circuit 16 delivers a malfunction detection signal G to HDC 17 in the case where the generation cycle of the sync signal for the servo data is longer or shorter than the predetermined cycle Tx, that is, if the generation cycle of the sync signal is malfunctional, HDC 17 determines that a malfunction occurs in connection with the servo data involved. In the servo system, it is easy to separate the sync signal from the servo data. It is, therefore, possible to simply and reliably detect a malfunction relating to the servo data at the time of head's positioning control operation by monitoring the cycle of the sync signal.

According to the present invention, malfunction can be more positively detected based on the servo head's servo data level even in the event of that servo head's servo data being somewhat varied than a conventional system which simply detects a malfunction of servo data.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A servo system for positioning a head within a data storage apparatus, comprising:
   a magnetic storage medium having prerecorded servo data, the servo data being used to position the head within the data storage apparatus and having units each of which comprises a sync signal and position data;
   means for reproducing the prerecorded servo data and for separating the sync signal from the servo data;
   means for generating a count period;
   means, responsive to the sync signal, for generating a pulse signal;
   malfunction detecting means for detecting the pulse signal and for detecting a malfunction in the servo data when the pulse signal is not detected during the count period, including output means for generating a malfunction detection signal upon detection of a malfunction in the servo data; and
   further comprising control means for stopping operation of said data storage apparatus in response to said malfunction detection signal.

* * * * *

UNITED STATES PATENT AND TRADEMARK OFFICE
CERTIFICATE OF CORRECTION

PATENT NO. : 5,355,260
DATED : October 11, 1994
INVENTOR(S) : Masako Mikada

It is certified that error appears in the above-indentified patent and that said Letters Patent is hereby corrected as shown below:

Title page, Column 2, after "Attorney, Agent, or Firm," "Finnigan" should read --Finnegan--.

Signed and Sealed this

Eighteenth Day of April, 1995

Attest:

BRUCE LEHMAN

Attesting Officer

Commissioner of Patents and Trademarks